(12) United States Patent
Berbari

(10) Patent No.: US 8,627,914 B2
(45) Date of Patent: Jan. 14, 2014

(54) ENERGY RECOVERY DRIVE SYSTEM AND VEHICLE WITH ENERGY RECOVERY DRIVE SYSTEM

(75) Inventor: George Edmond Berbari, Disputanta, VA (US)

(73) Assignee: ARC Energy Recovery, Inc., Disputanta, VA (US)

( * ) Notice: Subject to any disclaimer, the term of this patent is extended or adjusted under 35 U.S.C. 154(b) by 249 days.

(21) Appl. No.: 13/293,273

(22) Filed: Nov. 10, 2011

(65) Prior Publication Data

US 2013/0119665 A1    May 16, 2013

(51) Int. Cl.
    *B60L 11/16*    (2006.01)
(52) U.S. Cl.
    USPC ............................. 180/165; 290/50
(58) Field of Classification Search
    USPC ............... 180/165, 65.6, 65.1, 65.21, 65.22,
                     180/65.265, 65.29; 290/50; 475/5
    See application file for complete search history.

(56) References Cited

U.S. PATENT DOCUMENTS

| | | | |
|---|---|---|---|
| 3,724,288 A | 4/1973 | Jakubowski | |
| 3,858,674 A | 1/1975 | Tabor | |
| 3,870,116 A | 3/1975 | Seliber | |
| 3,878,913 A | 4/1975 | Lionts et al. | |
| 3,882,950 A | 5/1975 | Strohlein | |
| 3,948,047 A * | 4/1976 | Gilbert | 60/325 |
| 3,949,556 A | 4/1976 | Wallis | |
| 4,065,702 A | 12/1977 | Locker et al. | |
| 4,131,171 A | 12/1978 | Keyes | |
| 4,208,921 A | 6/1980 | Keyes | |
| 4,218,624 A * | 8/1980 | Schiavone | 290/45 |
| 4,233,858 A * | 11/1980 | Rowlett | 475/5 |
| 4,255,695 A | 3/1981 | Plunkett et al. | |
| 4,393,964 A | 7/1983 | Kemper | |
| 4,411,171 A | 10/1983 | Fiala | |
| 4,423,794 A * | 1/1984 | Beck | 180/165 |
| 4,588,040 A * | 5/1986 | Albright et al. | 180/165 |
| 4,597,463 A | 7/1986 | Barnard | |
| 4,629,947 A | 12/1986 | Hammerslag et al. | |
| 4,763,751 A * | 8/1988 | Gardner, Jr. | 180/305 |
| 4,854,414 A | 8/1989 | Koide et al. | |
| 5,141,173 A | 8/1992 | Lay | |
| 5,214,358 A | 5/1993 | Marshall | |
| 5,228,291 A | 7/1993 | Meyering | |
| 5,568,023 A | 10/1996 | Grayer | |
| 5,569,108 A | 10/1996 | Cadee | |
| 5,762,156 A | 6/1998 | Bates | |
| 5,765,656 A | 6/1998 | Weaver | |
| 5,767,595 A | 6/1998 | Rosen | |
| 5,880,544 A | 3/1999 | Ikeda | |

(Continued)

OTHER PUBLICATIONS

PCT International Search Report and Written Opinion in International Application No. PCT/US2012/062336, Jan. 9, 2013, 10 pages.

*Primary Examiner* — John R Olszewski
*Assistant Examiner* — Brodie Follman
(74) *Attorney, Agent, or Firm* — Brian J. Teague

(57) ABSTRACT

Vehicles of embodiments of the invention are propelled by an electric motor (DC or AC motor) coupled to one of the vehicle's axles. The electric motor is powered by two or more electrical storage devices (e.g., batteries or battery banks or capacitors). The electrical storage devices are charged by alternators driven by a rotating flywheel. The flywheel is selectively coupled to a different one of the vehicle axles, such that movement of the vehicle (caused by the electric motor) causes the rotation of the flywheel.

27 Claims, 4 Drawing Sheets

(56) References Cited

U.S. PATENT DOCUMENTS

| | | |
|---|---|---|
| 5,931,249 A | 8/1999 | Ellis |
| 5,934,396 A | 8/1999 | Kurita |
| 6,069,424 A | 5/2000 | Colello |
| 6,098,584 A * | 8/2000 | Ahner et al. ............... 123/179.3 |
| 6,175,172 B1 * | 1/2001 | Bakholdin et al. .............. 310/74 |
| 6,232,743 B1 | 5/2001 | Nakanishi |
| 6,392,380 B2 | 5/2002 | Furukawa |
| 6,573,626 B1 | 6/2003 | Gosebruch |
| 6,615,118 B2 | 9/2003 | Kumar |
| 6,962,223 B2 * | 11/2005 | Berbari ........................ 180/165 |
| 7,540,346 B2 * | 6/2009 | Hu ............................... 180/165 |
| 7,689,332 B2 | 3/2010 | Yakes et al. |
| 8,104,560 B1 * | 1/2012 | Huang ......................... 180/165 |
| 8,180,511 B2 * | 5/2012 | Bowman et al. ................ 701/22 |
| 2003/0102672 A1 | 6/2003 | King et al. |
| 2004/0262062 A1 * | 12/2004 | Berbari ........................ 180/165 |
| 2006/0030450 A1 * | 2/2006 | Kyle ................................ 477/3 |
| 2006/0213703 A1 | 9/2006 | Long |
| 2007/0163828 A1 * | 7/2007 | Manganaro ................... 180/165 |
| 2008/0217921 A1 * | 9/2008 | Raftery ......................... 290/53 |
| 2010/0044129 A1 * | 2/2010 | Kyle ......................... 180/65.25 |
| 2010/0184549 A1 * | 7/2010 | Sartre et al. ..................... 475/5 |
| 2011/0106359 A1 * | 5/2011 | Tanaka et al. ................... 701/22 |
| 2012/0255798 A1 * | 10/2012 | Palmer ........................ 180/65.6 |
| 2013/0119665 A1 * | 5/2013 | Berbari ........................ 290/50 |

\* cited by examiner

ENERGY RECOVERY DRIVE SYSTEM AND VEHICLE WITH ENERGY RECOVERY DRIVE SYSTEM

FIELD OF THE INVENTION

The present invention relates generally to vehicles and vehicle drive systems, and more particularly to vehicles and vehicle drive systems having energy recovery capabilities.

BACKGROUND

The need for energy efficient and clean-running vehicles has existed for many years. This urgency is constantly reinforced by higher fuel prices, dwindling fuel supplies, and reports of dire environmental effects of internal combustion engine exhaust. Much of the popular effort directed to solving these problems includes increasing the efficiency of internal combustion engines thereby resulting in cars with greater gas mileage.

One area of effort in seeking fuel efficient vehicles is in the hybrid type of cars. Generally speaking, these cars combine gas and electric motors. Those motors complement each other to obtain efficiencies. In some of these types of cars, small flywheels are used to recharge the electric batteries that assist in the drive of the car. These flywheels are typically actuated only during the braking of the vehicle. The use of the flywheel is effective for this recharging purpose only.

A still further type of technology used in connection with efficient and environmentally friendly cars is a flywheel-driven vehicle where the rotation of the flywheel is created by an electric motor and/or an internal combustion engine. In the alternative of an electric motor driving a flywheel, there is typically included a recharging feature that recharges the battery that drives the electric motor upon deceleration of the vehicle. Hypothetically, this may be seen to be very efficient. The difficulty is in the actual execution of the concept. One problem is the use of a single battery or energy source that must run the motor to rotate the flywheel and be recharged.

BRIEF SUMMARY

In one embodiment of the invention, a vehicle comprises a first axle and corresponding first gearbox, a flywheel, one or more alternators, a second axle and corresponding second gearbox, an electric motor, first and second main electrical storage devices, one or more auxiliary electrical storage devices, and a charging assembly. The flywheel is selectively coupled to the first gearbox via a first engagement/disengagement mechanism such that rotation of the first axle selectively causes rotation of the flywheel. The one or more alternators are selectively coupled to the flywheel via a second engagement/disengagement mechanism such that the one or more alternators selectively generate electricity when the flywheel is rotating. The electric motor is coupled to the second gearbox to cause rotation of the second axle when the electric motor is powered. The first and second main electrical storage devices are electrically connected to the electric motor and configured such that the first main electrical storage device powers the electric motor while the second main electrical storage device is charged and configured such that the second main electrical storage device powers the electric motor while the first main electrical storage device is charged. The one or more auxiliary electrical storage devices are electrically connected to the one or more alternators and configured such that the one or more alternators charge the auxiliary electrical storage devices when the one or more alternators are coupled to the flywheel. The charging assembly is electrically connected to the main and auxiliary electrical storage devices and configured such that the auxiliary electrical storage devices charge the first main electrical storage device while the second main electrical storage devices powers the electric motor and configured such that the auxiliary electrical storage devices charge the second main electrical storage device while the first main electrical storage devices powers the electric motor.

The first engagement/disengagement mechanism may comprise a first clutch. The first clutch may comprise a first electric clutch. Alternatively, the first clutch may comprise a first sprag clutch.

The second engagement/disengagement mechanism may comprise a second clutch. The second clutch may comprise a second electric clutch.

The second engagement/disengagement mechanism may comprise one clutch coupled to each of the one or more alternators.

The first and second main electrical storage devices may respectively comprise first and second main battery banks. The first and second main battery banks may each comprise a plurality of individual batteries.

The first and second auxiliary electrical storage devices may respectively comprise first and second auxiliary battery banks. The first and second auxiliary battery banks may each comprise a plurality of individual batteries.

The first and second main electrical storage devices may respectively comprise one or more capacitors. The first and second auxiliary electrical storage devices may respectively comprise one or more capacitors.

The electric motor may comprise either an AC motor or a DC motor. If the electric motor comprises an AC motor, the vehicle may further comprise one or more inverters electrically coupled to the AC motor and to the first and second main electrical storage devices.

The vehicle may further comprise a braking system and a controller configured for determining that the braking system has been activated and for causing the first engagement/disengagement mechanism to disengage the flywheel from the first gearbox in response to the activation of the braking system.

The vehicle may further comprise a controller configured for determining that a speed of a vehicle is above a predetermined minimum and for causing the first engagement/disengagement mechanism to engage the flywheel to the first gearbox in response.

The vehicle may further comprise a controller configured for determining that a load of the electric motor is above a predetermined maximum and for causing the first engagement/disengagement mechanism to disengage the flywheel from the first gearbox in response. The vehicle may further comprise a flywheel rotational speed sensor, and the controller may be further configured for determining that the rotational speed of the flywheel is below a predetermined minimum and for causing the second engagement/disengagement mechanism to disengage the one or more alternators from the flywheel in response. The controller may be further configured for determining that the load of the electric motor is at or below the predetermined maximum and for causing the first engagement/disengagement mechanism to re-engage the flywheel to the first gearbox in response. The controller may be further configured for determining that the rotational speed of the flywheel is at or above the predetermined minimum and for causing the second engagement/disengagement mechanism to re-engage the one or more alternators to the flywheel in response.

The vehicle may further comprise a flywheel rotational speed sensor and a controller configured for determining that the rotational speed of the flywheel is above a predetermined minimum and for causing the second engagement/disengagement mechanism to engage the one or more alternators from the flywheel in response.

The vehicle may further comprise a switching system configured for controlling which of the first and second main electrical storage devices powers the electric motor and which is recharged. The vehicle may further comprise one or more voltage sensors for determining a voltage of each of the first and second main electrical storage devices, in which case the switching system may be configured to switch which electrical storage devices powers the electric motor and which is recharged when the voltage of the electrical storage device powering the electric motor is below a predetermined minimum.

The electric motor and second gearbox may be configured such that the electric motor rotates in a first direction to propel the vehicle forward and in a second direction to propel the vehicle backward. The vehicle may further comprise a direction selector for selecting whether the electric motor rotates in a first direction to propel the vehicle forward or rotates in a second direction to propel the vehicle backward, and a controller configured for determining that the direction selector is set for the electric motor to rotate in a second direction to propel the vehicle backward and for causing the first engagement/disengagement mechanism to disengage the flywheel from the first gearbox in response.

The charging assembly may comprise an inverter/charger for each of the one or more alternators or a separate inverter and charger for each of the one or more alternators.

The vehicle may further comprise a flywheel brake configured for rapidly stopping the flywheel.

The first axle may comprise a first split axle. The first gearbox may comprise a first differential. The second axle may comprise a second split axle. The second gearbox may comprise a second differential.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the invention may comprise a vehicle having an energy recovery drive system. Additionally, embodiments of the invention may comprise an energy recovery drive system, with or without the accompanying vehicle. The vehicle in embodiments of the invention may comprise any desired vehicle to which the energy recovery drive system may be affixed, including but not limited to cars, trucks, SUVs, motorcycles, buses, trains, streetcars, trolleys, agricultural vehicles (e.g., tractors, combines), and the like.

Vehicles of embodiments of the invention are propelled by an electric motor (DC or AC motor) coupled to one of the vehicle's axles. The electric motor is powered by two or more electrical storage devices (e.g., batteries or battery banks or capacitors). The electrical storage devices are charged by alternators driven by a rotating flywheel. The flywheel is selectively coupled to a different one of the vehicle axles, such that movement of the vehicle (caused by the electric motor) causes the rotation of the flywheel.

Figure 1:
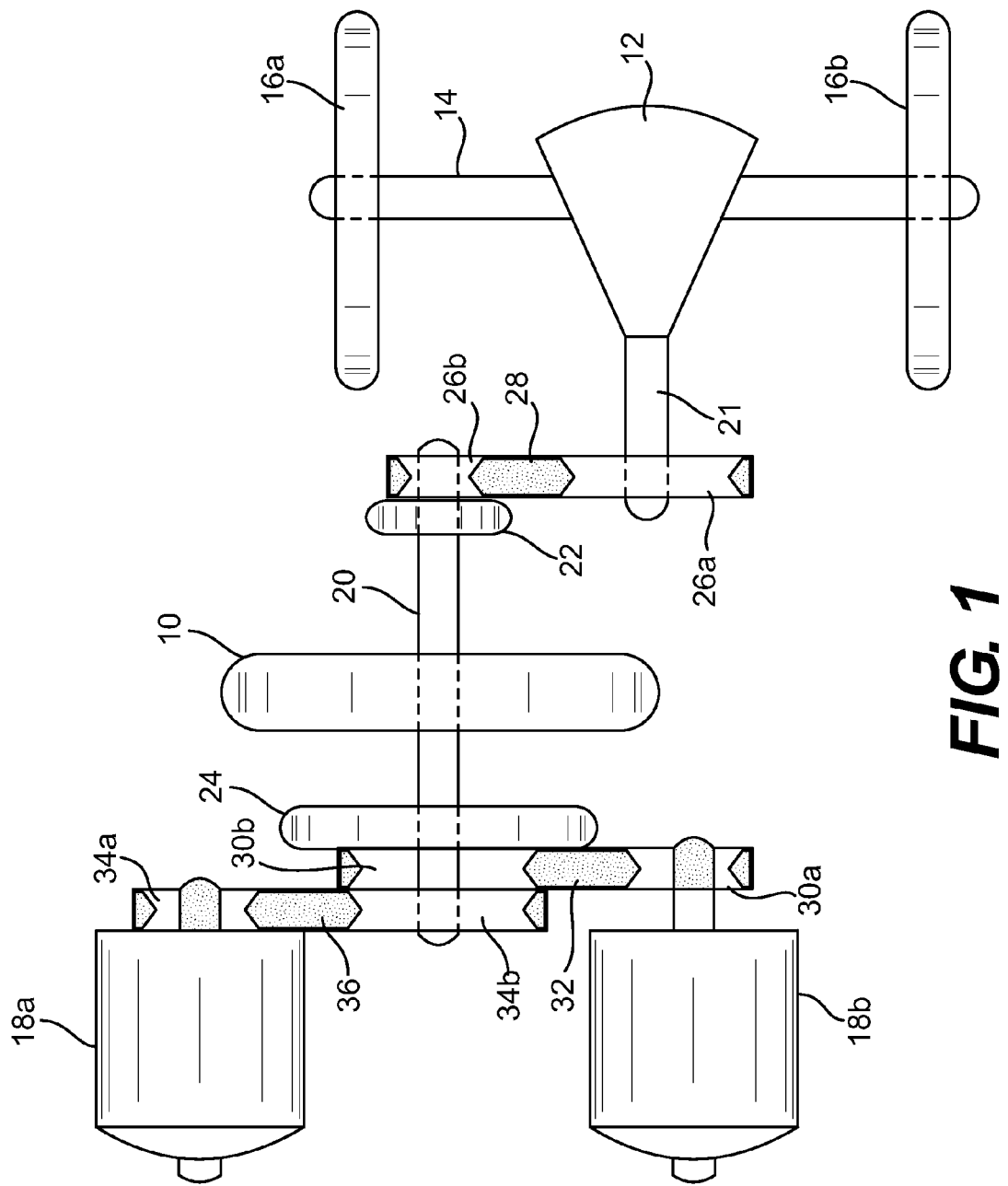
FIG. 1 is a schematic block diagram of an energy recovery portion of a vehicle with an energy recovery drive system, in accordance with embodiments of the invention.
Figure 2:
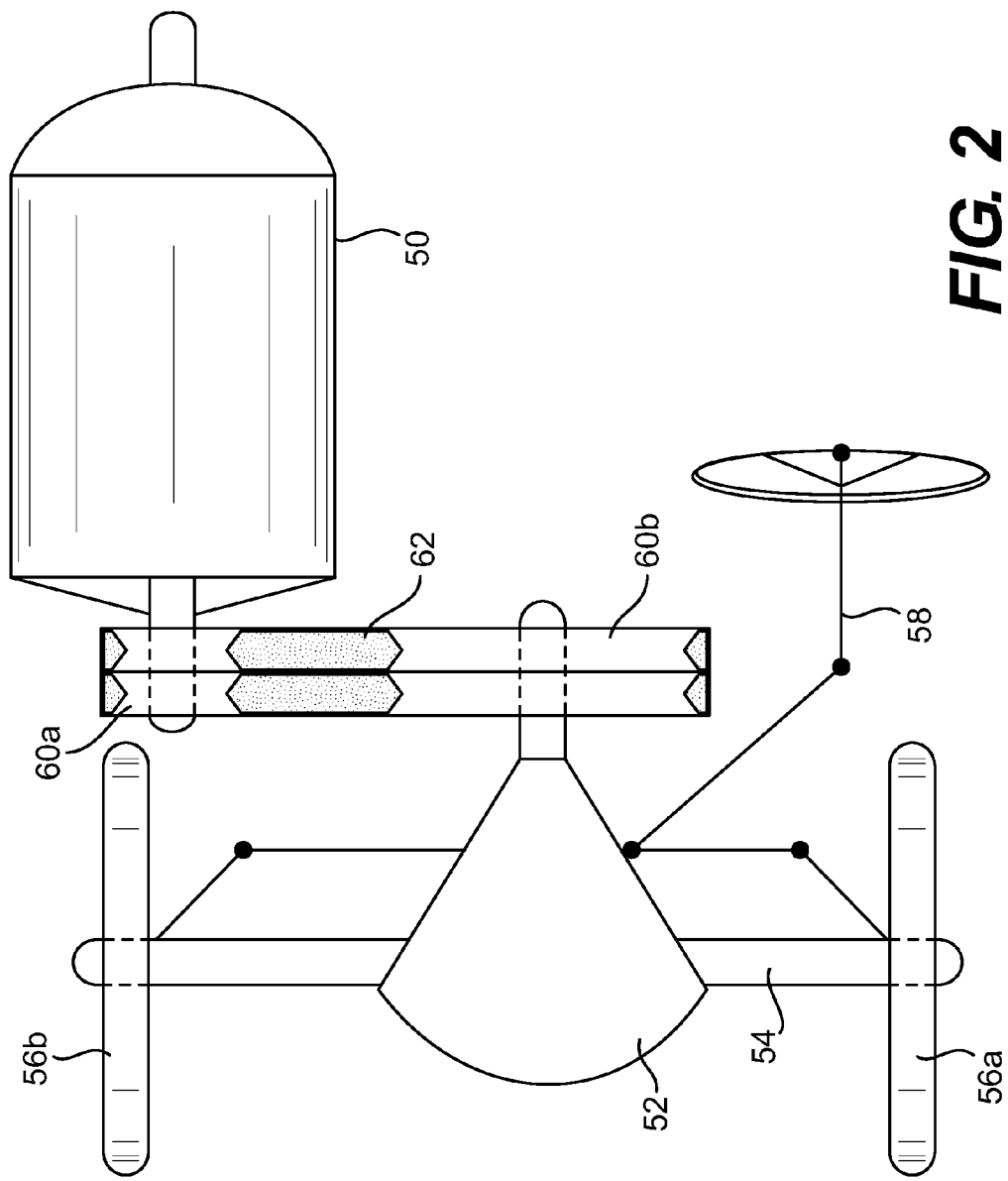
FIG. 2 is a schematic block diagram of a propulsion portion of a vehicle with an energy recovery drive system, in accordance with embodiments of the invention.

Embodiments of the invention will now be described in more detail. FIG. 1 is a schematic block diagram of the energy recovery portion of a mechanical system of a vehicle with an energy recovery drive system, in accordance with embodiments of the invention. FIG. 2 is a schematic block diagram of the propulsion portion of the mechanical system of a vehicle with an energy recovery drive system, in accordance with embodiments of the invention. An energy recovery system of a vehicle of one embodiment of the invention comprises a first axle 14 and corresponding first gearbox 12. The first gearbox may be, for example, a differential. In a standard automobile, such a differential may have for example a gear ratio of 3.73:1 (i.e., for every one rotation of the wheel, the shaft 21 of the gearbox rotates 3.73 times). The gear ratios described herein are for illustrative purposes only—any desired and suitable gear ratios may be used. The axle may be, for example, a split axle. The axle is coupled to two wheels 16a, 16b.

A flywheel 10, mounted on shaft 20, is selectively coupled to the first gearbox 12 via a first clutch 22. First clutch 22 may comprise an electric clutch (also termed electro-magnetic clutch), which may be selectively engaged or disengaged. Such a clutch is generically termed herein an engagement/disengagement mechanism. In an alternative embodiment, the first clutch 22 may comprise a sprag clutch (i.e., a one-way freewheel clutch). The flywheel shaft 20 is coupled to the differential shaft 21 by pulleys 26a, 26b and belt 28, however any suitable mechanical coupling may be used (e.g., chain and sprockets). A further gear ratio may be introduced in the coupling between the flywheel shaft and the differential, as needed and desired. For example, in one prototype of the invention a 1.8:1 ratio is introduced in the coupling between the flywheel shaft and the differential. When combined with the 3.73:1 ratio in a typical differential, a total (flywheel: wheel) ratio of 6.71:1 is obtained. That is, the flywheel will rotate 6.71 times for each one rotation of the wheels. A total ratio of between 6:1 and 7:1 is believed to be desirable. If no further gear ratio needs to be introduced beyond that of the gearbox (differential), then the flywheel shaft 20 may be directly coupled to the gearbox shaft 21.

The flywheel 10 mounted on the flywheel shaft 20 is typically placed inside a vacuum chamber (not illustrated). In one example embodiment of the invention, the flywheel may be 36 inches in diameter, comprising one-inch thick steel. The flywheel may be centered between and supported by two block bearings (not illustrated) which are also mounted inside the vacuum chamber. The vacuum chamber may be evacuated of gas through a valve (not illustrated) using a conventional 12 volt vacuum pump (not illustrated) that may be applied manually before use or as necessary. A vacuum pump may also be turned on continuously.

The weight of the flywheel 10 is typically selected to be proportional to the size/weight of the vehicle to be put in motion. It has been found that the weight of the flywheel 10 should typically be no less than about 5% of the gross weight of the vehicle, and no more than about 10% of the gross weight of the vehicle in order to be efficient. The flywheel 10 should typically be arranged vertically above the transmission or drive system (drive shaft). Such a mounting arrangement allows the center shaft of the flywheel to be parallel to the input shaft of the transmission, to allow for the efficient centering of the weight of the vehicle.

As the vehicle is propelled forward (by the electric motor as discussed in more detail below), the wheels 16*a*, 16*b* rotate (the rotation of the wheel being caused by the forward movement of the vehicle and the friction of the road surface against the wheels) causing rotation of the axle 14. Rotation of the axle 14 causes rotation of the differential shaft 21, further causing rotation of pulley 26*a* and (by way of belt 28) pulley 26*b*. If first clutch 22 is engaged, the rotation of pulley 26*b* will cause rotation of the flywheel shaft and thereby the flywheel. If first clutch 22 is not engaged, the rotation of pulley 26*b* will not cause rotation of the flywheel shaft or the flywheel. The selective engagement and disengagement of first clutch 22 is discussed in more detail below.

Coupled to the flywheel shaft on the opposite side of the flywheel is second clutch 24, which may comprise an electric clutch (also termed electro-magnetic clutch). One or more alternators (two alternators are believed to be desirable, and two alternators 18*a*, 18*b* are illustrated in FIG. 1) are coupled to pulleys 34*a*, 34*b* and belt 36 (for alternator 18*a*) and pulleys 30*a*, 30*b* and belt 32 (for alternator 18*b*). Pulleys 30*b*, 34*b* are in turn selectively coupled to the flywheel shaft via second clutch 24. Thus, when flywheel 10 is rotating and second clutch 24 is engaged, alternators 18*a*, 18*b* will be driven and will generate electricity. If second clutch 24 is disengaged, alternators 18*a*, 18*b* will not generate electricity regardless of whether flywheel 10 is rotating. Alternators 18*a*, 18*b* are used to recharge the auxiliary electric storage devices as discussed in more detail below. While FIG. 1 illustrates one second clutch 24 selectively coupling both alternators to the flywheel, alternate embodiments of the invention may comprise two second clutches with one clutch coupled to each of the two alternators.

Although not illustrated in FIG. 1, a vehicle of embodiments of the invention may further comprise a flywheel brake. Such a flywheel brake may be configured for rapidly stopping the flywheel, such as in case of an accident or other emergency. Such a flywheel brake may be activated by a sensor system similar to the deceleration sensor that triggers deployment of a vehicle's airbags. Such a flywheel brake may comprise any suitable braking mechanism, such as a hydraulically activated caliper.

Referring now to FIG. 2, a schematic block diagram of the propulsion portion of a mechanical system of a vehicle with an energy recovery drive system is illustrated in accordance with embodiments of the invention. The vehicle further comprises a second axle 54 and corresponding second gearbox 52. The second gearbox may be, for example, a differential. The axle may be, for example, a split axle. The axle is coupled to two wheels 56*a*, 56*b*. A steering system 58 (simplistically illustrated in FIG. 2) controls the turning of wheels 56*a*, 56*b*. An electric motor 50 is coupled to the second gearbox 52 to cause rotation of the second axle when the electric motor is powered. The electric motor 50 is coupled to the gearbox via pulleys 60*a*, 60*b* and belt 62, although any suitable mechanical coupling arrangement may be used. For example, it may be possible to directly couple (i.e., without gearing) the motor shaft to the shaft of the second gearbox. The system for providing electric power to electric motor 50 is discussed in more detail below.

Figure 3:
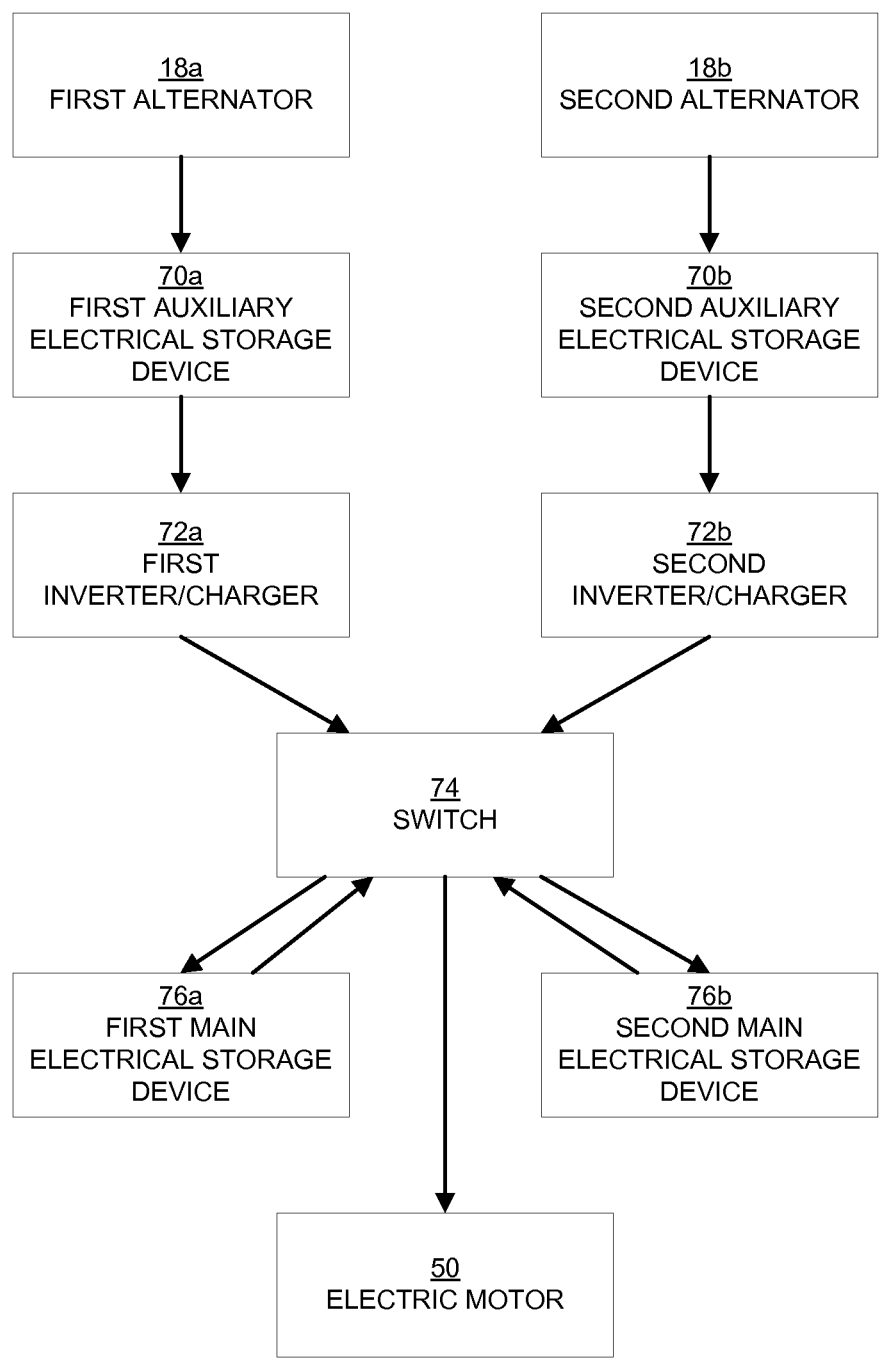
FIG. 3 is a schematic block diagram of an electrical system of a vehicle with an energy recovery drive system, in accordance with embodiments of the invention.

Referring now to FIG. 3, a schematic block diagram of an electrical system of a vehicle with an energy recovery drive system is illustrated in accordance with embodiments of the invention. The electrical system comprises first alternator 18*a* and second alternator 18*b*, and first auxiliary electrical storage device 70*a* and second auxiliary electrical storage device 70*b*. As discussed above, the alternators are selectively coupled to the flywheel 10. When flywheel 10 is rotating and second clutch 24 is engaged, first and second alternators 18*a*, 18*b* will generate electricity to recharge, respectively, first and second auxiliary electrical storage devices 70*a*, 70*b*. Two alternators are believed to be desirable, and as such are illustrated and described herein. However, any suitable number of alternators may be used. The capacity of alternators 18*a*, 18*b* is selected to provide sufficient power to charge the auxiliary electrical storage devices. For example, in one prototype of the invention, 200 amp alternators were selected.

The auxiliary electrical storage devices 70*a*, 70*b* are used to recharge the main electrical storage devices (described in more detail below). First auxiliary electrical storage device 70*a* and second auxiliary electrical storage device 70*b* are electrically connected respectively to first inverter/charger 72*a* and second inverter/charger 72*b*. While combined inverter/chargers are illustrated, embodiments of the invention may alternatively comprise separate inverters and chargers. Chargers (whether separate or part of an inverter/charger assembly) operate on AC current, therefore inverters are necessary to convert the output of the auxiliary electrical storage devices from DC to AC.

First and second auxiliary electrical storage devices may each comprise any suitable electrical storage device, such as a single battery, a plurality ("bank") of batteries, or one or more capacitors (such as an electric double-layer capacitor (EDLC), also known as a supercapacitor or ultracapacitor). If one or more batteries are used, any suitable type of battery may be used (e.g., lead acid, lithium ion, or nickel metal hydride). The capacity and/or number of electrical storage devices may be selected to provide the desired storage capacity. The desired storage capacity typically needs to be balanced with the cost, weight, and space requirement of the electrical storage devices. In one prototype, each auxiliary electrical storage device comprised a bank of four batteries, each with a 12 volt capacity, electrically connected in parallel. As another example, 24 volt batteries may be used, such as by connecting two 12 volt batteries in series. While the use of two auxiliary electrical storage devices is illustrated and described herein, embodiments of the invention may comprise only one auxiliary electrical storage device or more than two auxiliary electrical storage devices, as needed and desired.

The electrical system further comprises a first main electrical storage device 76*a* and second main electrical storage device 76*b*. First and second main electrical storage devices may each comprise any suitable electrical storage device, such as a single battery, a plurality ("bank") of batteries, or one or more capacitors (such as an electric double-layer capacitor (EDLC), also known as a supercapacitor or ultracapacitor). If one or more batteries are used, any suitable type of battery may be used (e.g., lead acid, lithium ion, or nickel metal hydride). The capacity and/or number of electrical storage devices may be selected to provide the desired storage capacity. The desired storage capacity typically needs to be balanced with the cost, weight, and space requirement of the electrical storage devices. In one prototype, each main electrical storage device comprised a bank of thirteen batteries, each with a 12 volt capacity, electrically connected in series for a total capacity of 156 volts in each main battery bank. While the use of two main electrical storage devices is illustrated and described herein, embodiments of the invention may comprise more than two main electrical storage devices, as needed and desired. Typically, at least two main electrical storage devices are necessary to enable one storage device to power the electric motor while another storage device is recharged.

The first and second main electrical storage devices may be mounted on the vehicle in two separate groups and are typically wired to only power the electric motor. This means that typically no power out of these main electrical storage devices is used for anything other than the electric motor. The vehicle may further include a separate (typically 12 volt) battery system (not illustrated) to provide all other on-board power requirements including lights, radio, etc. Because the main electrical storage devices constitute a significant weight, they are preferably mounted so that they are equally spaced with respect to the drive axis and within the boundaries of the chassis.

The electrical system further comprises switch 74. Switch 74 connects the first and second inverter/chargers 72a, 72b to the first and second main electrical storage devices 76a, 76b to recharge the first and second main electrical storage devices (as described in more detail below). In one embodiment of the invention, switch 74 connects both the first and second inverter/chargers 72a, 72b together to either the first or second main electrical storage device, depending on which main electrical storage device needs to be charged. In other words, both inverter/chargers are used together to alternately charge one or the other main electrical storage device. In an optional embodiment of the invention, first inverter/charger 72a may charge first main electrical storage device 76a and second inverter/charger 72b may charge second main electrical storage device 76b. In yet another optional embodiment of the invention, a single inverter/charger may be used to alternately charge the main electrical storage devices.

First and second main electrical storage devices 76a, 76b are electrically connected to the electric motor 50 via switch 74. First and second main electrical storage devices 76a, 76b, first and second inverter/chargers 72a, 72b, and switch 74 are configured such that either (a) the first main electrical storage device 76a powers the electric motor while the second main electrical storage device is charged by the first and second inverter/chargers 72a, 72b, or (b) the second main electrical storage device 76b powers the electric motor while the first main electrical storage device 76a is charged by the first and second inverter/chargers 72a, 72b. In other words, switch 74 will direct the flow of electric current from one main electrical storage device to the electric motor while at the same time directing the flow of current from the inverter/chargers to the main electrical storage device that is not being used to drive the motor. Thereby, the switch 74 maintains the continued running of the motor without interruption in an instantaneous, in-sync operation.

Figure 4:
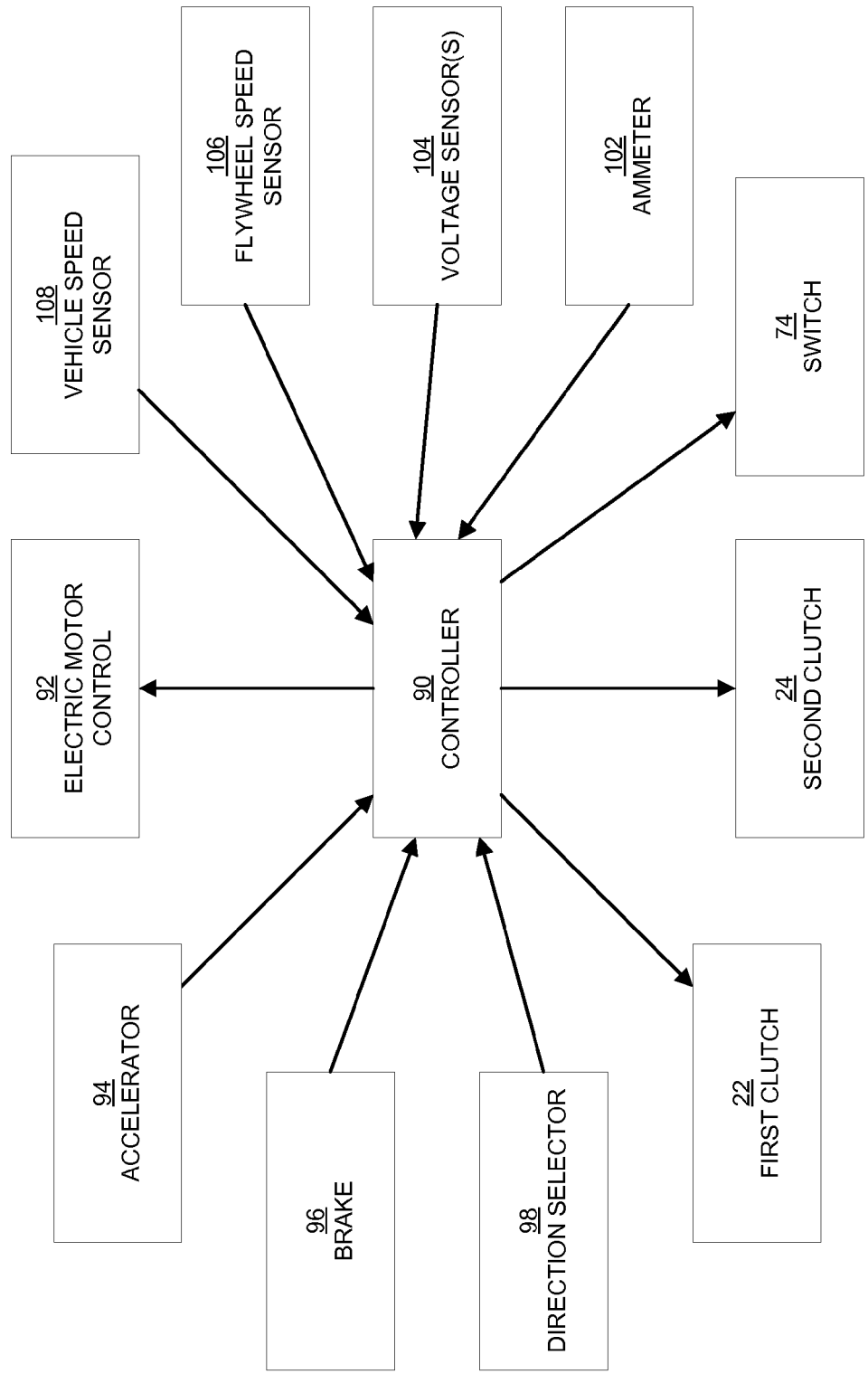
FIG. 4 is a schematic block diagram of a control system of a vehicle with an energy recovery drive system, in accordance with embodiments of the invention.

The voltage in each of the first and second main electrical storage devices is monitored, such as by using a voltage sensor 104 as illustrated in FIG. 4. When the voltage of the electrical storage device powering the electric motor reaches a predefined minimum voltage (which may be, for example, about 70% of capacity), switch 74 (controlled by controller 90 as discussed in more detail below) switches which main electrical storage device is powering the electric motor and which main electrical storage device is being recharged by the inverter/chargers.

This alternation between which main electrical storage device is charged and which powers the electric motor is desirable to ensure that one of the main electrical storage devices always has a sufficient charge to power the electric motor.

Switch 74 may comprise a single switch, as illustrated and described, or separate switches may be used. If separate switches are used, one switch may be used to direct the charging current from the inverter/chargers to the main electrical storage devices and one switch may be used to direct the current from the main electrical storage devices to power the electric motor. Switch 74 (or multiple switches, if desired) may be controlled by controller 90 as illustrated in FIG. 4.

While not illustrated in FIG. 3, the electrical system of a vehicle of embodiments of the invention may further comprise an external electrical connection to enable the main and/or auxiliary electrical storage devices to be charged from an external source. For example, the vehicle may be plugged into a charging system overnight where the vehicle is garaged. Such supplemental charging enables the electrical storage devices to be fully charged ("soaked"). This is desirable because the electrical storage devices do not reach "soak" when being charged by the alternators (for the auxiliary electrical storage devices) or by the inverter/chargers (for the main electrical storage devices).

As discussed above, the electric motor of embodiments of the invention may comprise either an AC motor or a DC motor. FIG. 3 illustrates a DC motor, as the motor is directly powered by the main electrical storage devices. If the electric motor comprises an AC motor, the vehicle would further comprise one or more inverters electrically coupled to the AC motor and to the first and second main electrical storage devices. Such an inverter would be necessary to convert the DC output of the main electrical storage devices into AC to power the AC motor. Such an inverter may be contained within a motor control (such as electric motor control 92 of FIG. 4).

Referring now to FIG. 4, a schematic block diagram of the control system of a vehicle with an energy recovery drive system is illustrated in accordance with embodiments of the invention. Controller 90 receives signals from various elements of the vehicle, executes control logic (stored in memory, not illustrated), and send control signals to various elements of the vehicle. The controller may be comprised of a microprocessor, dedicated or general purpose circuitry (such as an application-specific integrated circuit or a field-programmable gate array), a suitably programmed computing device, or any other suitable means for controlling the operation of the vehicle. One controller may be used for all control functions, or multiple controllers may be used, such that different control functions are handled by different controllers.

Controller 90 receives an acceleration signal from accelerator 94 and, in response, sends a signal to electric motor control 92 to cause the electric motor to run at a predetermined rotational speed to propel the vehicle at the desired speed.

Controller 90 receives a braking signal from brake 96 and, in response, sends a signal to electric motor control 92 to cause the electric motor to slow or stop. Additionally, controller 90 sends a signal to first clutch 22 to disengage the first clutch and thereby disengage the flywheel from the first gearbox in response to the activation of the brake. This disengagement of the flywheel is necessary to prevent the rotation of the flywheel (which will continue for a significant period of time once the flywheel begins rotating) from propelling the vehicle by way of the first gearbox and first axle. Without disengaging the flywheel from the first gearbox, the substantial torque of a flywheel rotating at high speed could likely overcome the braking capacity of the vehicle and continue to propel the vehicle forward despite the application of the brakes and the driver's desire to stop the vehicle. Thus, this ability to disengage the flywheel from the first gearbox is an important safety and operational feature of embodiments of the invention.

The electric motor and second gearbox are configured such that the electric motor rotates in a first direction to propel the vehicle forward and in a second direction to propel the vehicle backward. The vehicle of embodiments of the invention further comprises direction selector 98 to enable a driver to select whether the vehicle is to be propelled forward (by having the electric motor rotate in a first direction) or is to be propelled in reverse (by having the electric motor rotate in a second direction). Controller 90 receives a signal from direction selector 98 corresponding to either a desired forward direction or a desired reverse direction of the vehicle. In response, controller 90 sends a signal to electric motor control 92 to cause the electric motor to rotate in the appropriate direction to propel the vehicle in the desired direction. If the direction selector 98 is set to indicate that the driver desires to have the vehicle propelled in reverse, controller 90 further sends a signal to first clutch 22 to disengage the first clutch and thereby disengage the flywheel from the first gearbox. This disengagement of the flywheel is necessary to prevent the rotation of the flywheel (which will continue for a significant period of time once the flywheel begins rotating) from preventing propulsion of the vehicle in reverse (as the flywheel, if engaged, would propel the vehicle forward by way of the first gearbox and first axle).

The vehicle of embodiments of the invention may further comprise ammeter 102, which determines the current draw of the electric motor which is indicative of the motor load. Controller 90 monitors the motor amperage by way of a signal received from ammeter 102. When controller 90 determines that the motor amperage is above a predetermined maximum, controller 90 sends a signal to first clutch 22 to disengage the flywheel from the first gearbox in response. The predetermined maximum motor amperage may be, for example about 60-70 amps, but will typically vary depending on the type of vehicle, type of application, usage, etc. Such a detected increase in the motor load may indicate that propelling the vehicle and at the same time (indirectly) rotating the flywheel (by way of propelling the vehicle and thereby rotating the wheels attached to the first axle) is loading the motor too much as compared to only propelling the vehicle. This disengagement of the flywheel from the first gearbox may be necessary to reduce the load on the motor, as the motor will then only be propelling the vehicle and not (indirectly) rotating the flywheel.

If the flywheel is disengaged from the first gearbox and the alternators are still engaged with the flywheel, the work of having the flywheel rotate the alternators will slow the rotational speed of the flywheel. However, it is not desirable to allow the rotational speed of the flywheel to decrease too much, as it requires a significant extra amount of work by the electric motor to propel the vehicle while bringing the flywheel back up to the desired speed (typically about 5000-6000 revolutions per minute (RPM)). Thus, the vehicle of embodiments of the invention may further comprise flywheel speed sensor 106, which may comprise for example a proximity sensor capable of detecting and timing the rotations of the flywheel to determine the rotational speed (in revolutions per minute (RPM)) of the flywheel. Controller 90 monitors the rotational speed of the flywheel by way of a signal received from flywheel speed sensor 106. When controller 90 determines that the rotational speed of the flywheel is below a predetermined minimum, controller 90 sends a signal to second clutch 24 to disengage the alternators from the flywheel. The predetermined minimum flywheel rotational speed may be, for example about 1500 revolutions per minute (rpm), but may vary. Such a detected decrease in the rotational speed of the flywheel may indicate that rotating the alternator shafts is loading the flywheel too much, thereby slowing the flywheel. This disengagement of the alternators from the flywheel may be necessary to allow the flywheel to return to a higher speed sufficient to drive the alternators, at which point the alternators may be re-engaged to the flywheel via second clutch 24.

The controller may monitor the vehicle speed (via vehicle speed sensor 108), and re-engage the flywheel to the gearbox (via first clutch 22) after determining that the vehicle speed is above a predetermined minimum. The predetermined minimum speed may be, for example about 25 miles per hour (mph), but may vary. This re-engagement of the flywheel to the first gearbox may be possible at this point because the increased speed (and inertia) of the vehicle assists in the rotation of the flywheel. The controller may continue to monitor the rotational speed of the flywheel, and re-engage the alternators to the flywheel when the rotational speed of the flywheel gets back above the predetermined minimum (e.g., 1500 RPM).

The capability to monitor the flywheel speed is also useful when the vehicle is starting from a "cold stop" (i.e., when the flywheel is not rotating). Controller 90 may monitor the rotational speed of the flywheel by way of a signal received from flywheel speed sensor 106. When controller 90 determines that the rotational speed of the flywheel is above a predetermined minimum, controller 90 sends a signal to second clutch 24 to engage the alternators to the flywheel. The predetermined minimum flywheel rotational speed may be, for example about 1500 revolutions per minute (rpm), but may vary. By waiting to engage the alternators until the flywheel has reached a specified rotational speed, the load on the motor when starting the vehicle from a cold stop is reduced. Alternatively, the controller may monitor the vehicle speed (via vehicle speed sensor 108), and only engage the flywheel to the gearbox (via first clutch 22) after determining that the vehicle speed is above a predetermined minimum. The predetermined minimum speed may be, for example about 25 miles per hour (mph), but may vary. Waiting to engage the flywheel to the first gearbox until a specified vehicle speed is reached helps to reduce the load on the electric motor.

As discussed in detail above, switch 74 directs the flow of electric current from one main electrical storage device to the electric motor while at the same time directing the flow of current from the inverter/chargers to the main electrical storage device that is not being used to drive the motor. Controller 90 controls switch 74 to accomplish the desired switching. A vehicle of embodiments of the invention may further comprise one or more voltage sensors 104 for determining the voltage of each of the first and second main electrical storage devices. The controller may be configured to determine if the voltage of the main electrical storage device currently powering the motor is below a predetermined minimum (e.g., 70% of capacity). If so, the controller may be configured to cause switch 74 to switch which electrical storage devices powers the electric motor and which is recharged.

While embodiments of the invention are described herein in relation to vehicles having two axles, embodiments of the invention may comprise or be used with vehicles having more than two axles. Typically, one electric motor will be coupled to one axle (often termed a "drive axle") to propel the vehicle and the energy recovery system will be coupled to a different axle (such an axle is similar to what is often termed a "dead axle," but is not strictly a dead axle because it is not free-rotating but rather is selectively coupled to the flywheel; the axle to which the energy recovery system is couple will be referred to herein as an "energy recovery axle") to drive one flywheel. However, embodiments of the invention may comprise or be used with vehicles having more than two axles. Such embodiments of the invention having more than two axles may still have only one electric motor coupled to one axle and one flywheel coupled to one different axle. Alternatively, multiple electric motors could be coupled to multiple different drive axles, and/or multiple flywheels could be coupled to multiple different energy recovery axles. Embodiments of then invention may comprise or be used with vehicles having any suitable type of axle, such as split axles or straight axles. When embodiments of the invention are implemented in a typical two axle automobile, typically the front axle will be the drive axle and the energy recovery system will be coupled to the rear axle although other configurations are possible and within the scope of the present invention.

Further, while embodiments of the invention are described herein in relation to vehicles in which the energy recovery system is coupled to an axle connected to two wheels (which thereby provides a portion of the carriage of the vehicle), embodiments of the invention may comprise an energy recovery system coupled to an axle or shaft that is unrelated to the carriage of the vehicle. For example, embodiments of the invention may comprise an energy recovery system coupled to shaft in turn coupled to a single wheel that is underneath the center of the vehicle or protrudes from the side of the vehicle.

While embodiments of the invention are described herein as using one or more alternators, embodiments of the invention may use any suitable electrical generators.

The energy recovery system of embodiments of the invention may be used in any apparatus having sufficient movement to rotate the flywheel. The energy recovery system of embodiments of the invention may be used for purposes other than recharging batteries which power an electric drive motor. For example, the energy recovery system of embodiments of the invention may be used for powering other types of electrical equipment on a vehicle or other moving apparatus.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A vehicle comprising:
   a first axle and corresponding first gearbox;
   a flywheel selectively coupled to the first gearbox via a first engagement/disengagement mechanism such that rotation of the first axle selectively causes rotation of the flywheel;
   one or more alternators selectively coupled to the flywheel via a second engagement/disengagement mechanism such that the one or more alternators selectively generate electricity when the flywheel is rotating;
   a second axle and corresponding second gearbox;
   an electric motor coupled to the second gearbox to cause rotation of the second axle when the electric motor is powered;
   first and second main electrical storage devices electrically connected to the electric motor and configured such that the first main electrical storage device powers the electric motor while the second main electrical storage device is charged and configured such that the second main electrical storage device powers the electric motor while the first main electrical storage device is charged;
   one or more auxiliary electrical storage devices electrically connected to the one or more alternators and configured such that the one or more alternators charge the auxiliary electrical storage devices when the one or more alternators are coupled to the flywheel; and
   a charging assembly electrically connected to the main and auxiliary electrical storage devices and configured such that the auxiliary electrical storage devices charge the first main electrical storage device while the second main electrical storage devices powers the electric motor and configured such that the auxiliary electrical storage devices charge the second main electrical storage device while the first main electrical storage devices powers the electric motor.

2. The vehicle of claim 1, wherein the first engagement/disengagement mechanism comprises a first clutch.

3. The vehicle of claim 2, wherein the first clutch comprises a first electric clutch.

4. The vehicle of claim 2, wherein the first clutch comprises a first sprag clutch.

5. The vehicle of claim 1, wherein the second engagement/disengagement mechanism comprises a second clutch.

6. The vehicle of claim 5, wherein the second clutch comprises a second electric clutch.

7. The vehicle of claim 1, wherein the second engagement/disengagement mechanism comprises one clutch coupled to each of the one or more alternators.

8. The vehicle of claim 1, wherein the first and second main electrical storage devices respectively comprise first and second main battery banks.

9. The vehicle of claim 8, wherein the first and second main battery banks each comprise a plurality of individual batteries.

10. The vehicle of claim 1, wherein the first and second auxiliary electrical storage devices respectively comprise first and second auxiliary battery banks.

11. The vehicle of claim 10, wherein the first and second auxiliary battery banks each comprise a plurality of individual batteries.

12. The vehicle of claim 1, wherein the first and second main electrical storage devices respectively comprise one or more capacitors.

13. The vehicle of claim 1, wherein the first and second auxiliary electrical storage devices respectively comprise one or more capacitors.

14. The vehicle of claim 1, wherein the electric motor comprises either an AC motor or a DC motor, and wherein if the electric motor comprises an AC motor the vehicle further comprises one or more inverters electrically coupled to the AC motor and to the first and second main electrical storage devices.

15. The vehicle of claim 1, further comprising:
a braking system; and
a controller configured for determining that the braking system has been activated and for causing the first engagement/disengagement mechanism to disengage the flywheel from the first gearbox in response to the activation of the braking system.

16. The vehicle of claim 1, further comprising:
a controller configured for determining that a speed of a vehicle is above a predetermined minimum and for causing the first engagement/disengagement mechanism to engage the flywheel to the first gearbox in response.

17. The vehicle of claim 1, further comprising:
a controller configured for determining that a load of the electric motor is above a predetermined maximum and for causing the first engagement/disengagement mechanism to disengage the flywheel from the first gearbox in response.

18. The vehicle of claim 17, further comprising:
a flywheel rotational speed sensor;
wherein the controller is further configured for determining that the rotational speed of the flywheel is below a predetermined minimum and for causing the second engagement/disengagement mechanism to disengage the one or more alternators from the flywheel in response.

19. The vehicle of claim 18, wherein the controller is further configured for determining that the load of the electric motor is at or below the predetermined maximum and for causing the first engagement/disengagement mechanism to re-engage the flywheel to the first gearbox in response.

20. The vehicle of claim 19, wherein the controller is further configured for determining that the rotational speed of the flywheel is at or above the predetermined minimum and for causing the second engagement/disengagement mechanism to re-engage the one or more alternators to the flywheel in response.

21. The vehicle of claim 1, further comprising:
a flywheel rotational speed sensor; and
a controller configured for determining that the rotational speed of the flywheel is above a predetermined minimum and for causing the second engagement/disengagement mechanism to engage the one or more alternators from the flywheel in response.

22. The vehicle of claim 1, further comprising:
a switching system configured for controlling which of the first and second main electrical storage devices powers the electric motor and which is recharged.

23. The vehicle of claim 22, further comprising:
one or more voltage sensors for determining a voltage of each of the first and second main electrical storage devices;
wherein the switching system is configured to switch which electrical storage devices powers the electric motor and which is recharged when the voltage of the electrical storage device powering the electric motor is below a predetermined minimum.

24. The vehicle of claim 1, wherein the electric motor and second gearbox are configured such that the electric motor rotates in a first direction to propel the vehicle forward and in a second direction to propel the vehicle backward; and wherein the vehicle further comprises:
a direction selector for selecting whether the electric motor rotates in a first direction to propel the vehicle forward or rotates in a second direction to propel the vehicle backward; and
a controller configured for determining that the direction selector is set for the electric motor to rotate in a second direction to propel the vehicle backward and for causing the first engagement/disengagement mechanism to disengage the flywheel from the first gearbox in response.

25. The vehicle of claim 1, wherein the charging assembly comprises an inverter/charger for each of the one or more alternators or a separate inverter and charger for each of the one or more alternators.

26. The vehicle of claim 1, further comprising:
a flywheel brake configured for rapidly stopping the flywheel.

27. The vehicle of claim 1, wherein the first axle comprises a first split axle; wherein the first gearbox comprises a first differential; wherein the second axle comprises a second split axle; and wherein the second gearbox comprises a second differential.

* * * * *